(12) United States Patent
Kasahara et al.

(10) Patent No.: US 9,002,161 B2
(45) Date of Patent: Apr. 7, 2015

(54) OPTICAL MODULE

(75) Inventors: Ryoichi Kasahara, Atsugi (JP); Ikuo Ogawa, Atsugi (JP); Toshiki Nishizawa, Yokohama (JP); Yuji Mitsuhashi, Yokohama (JP)

(73) Assignees: Nippon Telegraph and Telephone Corporation, Tokyo (JP); NTT Electronics Corporation, Yokohama-Shi, Kanagawa (JP)

( * ) Notice: Subject to any disclaimer, the term of this patent is extended or adjusted under 35 U.S.C. 154(b) by 102 days.

(21) Appl. No.: 13/820,884

(22) PCT Filed: Sep. 6, 2011

(86) PCT No.: PCT/JP2011/004999
§ 371 (c)(1),
(2), (4) Date: Mar. 5, 2013

(87) PCT Pub. No.: WO2012/032769
PCT Pub. Date: Mar. 15, 2012

(65) Prior Publication Data
US 2013/0170791 A1     Jul. 4, 2013

(30) Foreign Application Priority Data
Sep. 7, 2010    (JP) ................. 2010-200182

(51) Int. Cl.
*G02B 6/42*     (2006.01)
*G06Q 99/00*    (2006.01)

(52) U.S. Cl.
CPC ............ *G02B 6/4204* (2013.01); *G06Q 99/00* (2013.01); *G02B 6/4214* (2013.01); *G02B 6/4257* (2013.01); *G02B 6/4265* (2013.01); *G02B 6/4286* (2013.01)

(58) Field of Classification Search
None
See application file for complete search history.

(56) References Cited

U.S. PATENT DOCUMENTS

| 5,737,133 A | 4/1998 | Ouchi et al. |
| 6,445,840 B1 * | 9/2002 | Fernandez et al. ............ 385/17 |
| 7,399,125 B1 | 7/2008 | Whaley et al. |

(Continued)

FOREIGN PATENT DOCUMENTS

| CN | 1379562 | 11/2002 |
| CN | 1959452 | 5/2007 |

(Continued)

OTHER PUBLICATIONS

International Search Report dated Oct. 11, 2011, issued in PCT/JP2011/004999 filed Sep. 6, 2011.

(Continued)

*Primary Examiner* — Mike Stahl
(74) *Attorney, Agent, or Firm* — Workman Nydegger

(57) ABSTRACT

A low-cost optical module with highly consistent properties. The optical module includes, in a housing, an optical waveguide array, an optical functional element array, lens optics using one or a plurality of lenses for optically coupling the optical waveguide array and the optical functional element array, and a mirror disposed so as to convert the propagation direction of optical beams transmitted by the lens optics such that the optical beams are incident on the optical incidence ports of the optical functional element array. The optical functional element array is affixed to the housing, and the angle of the mirror is fixed in place after the angle of the mirror is adjusted such that the optical waveguide array and the optical functional element array are optically coupled.

15 Claims, 7 Drawing Sheets

(56) References Cited

U.S. PATENT DOCUMENTS

| | | | |
|---|---|---|---|
| 7,606,454 B2 | 10/2009 | Furusawa | |
| 2004/0190832 A1* | 9/2004 | Brockhaus et al. | 385/49 |
| 2006/0239605 A1* | 10/2006 | Palen et al. | 385/14 |
| 2006/0239612 A1* | 10/2006 | De Dobbelaere et al. | 385/37 |
| 2007/0013017 A1* | 1/2007 | Badehi et al. | 257/432 |
| 2007/0292081 A1* | 12/2007 | Hashimoto et al. | 385/52 |
| 2009/0190624 A1 | 7/2009 | Almoric et al. | |
| 2009/0279830 A1* | 11/2009 | Nakagawa | 385/33 |

FOREIGN PATENT DOCUMENTS

| | | |
|---|---|---|
| JP | 04-088308 | 3/1992 |
| JP | 2002-243990 | 8/2002 |
| JP | 2003066288 | 3/2003 |
| JP | 3907051 | 4/2007 |
| JP | 2007-127797 | 5/2007 |
| JP | 2007-147958 | 6/2007 |
| JP | 2008-083663 | 4/2008 |
| JP | 2008-134444 | 6/2008 |

OTHER PUBLICATIONS

Office Action in corresponding Chinese Patent Application No. 201180043204.8 dated Aug. 19, 2014.

* cited by examiner

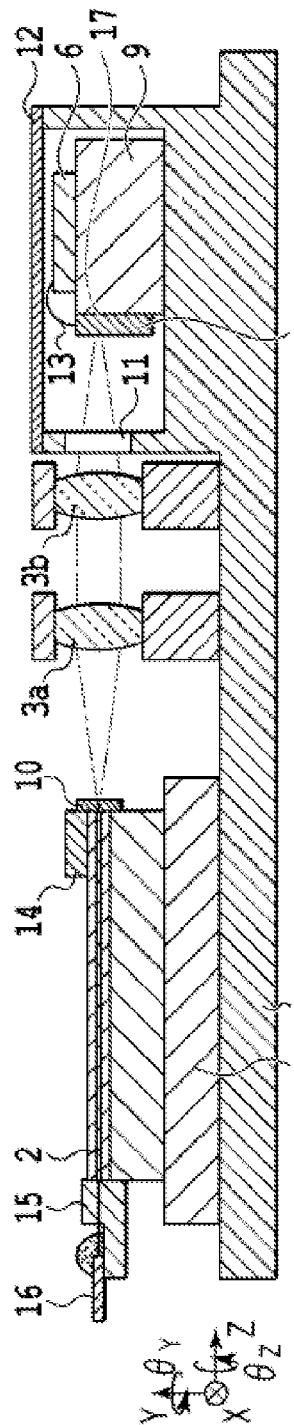
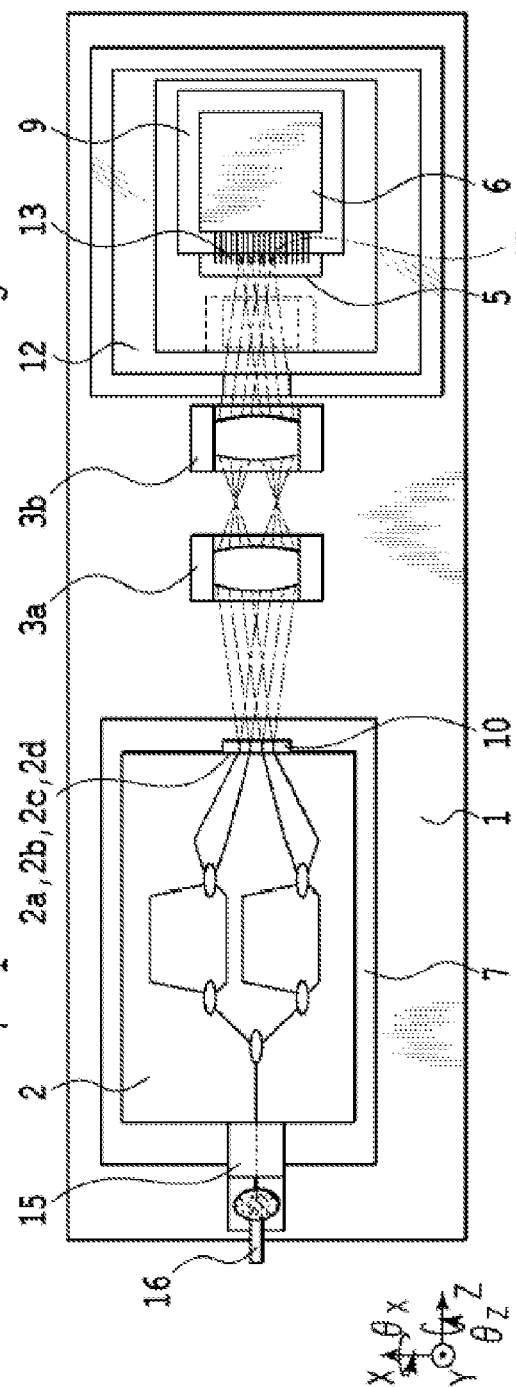
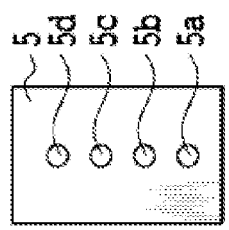
FIG. 2A Prior Art
FIG. 2B Prior Art
FIG. 2C Prior Art

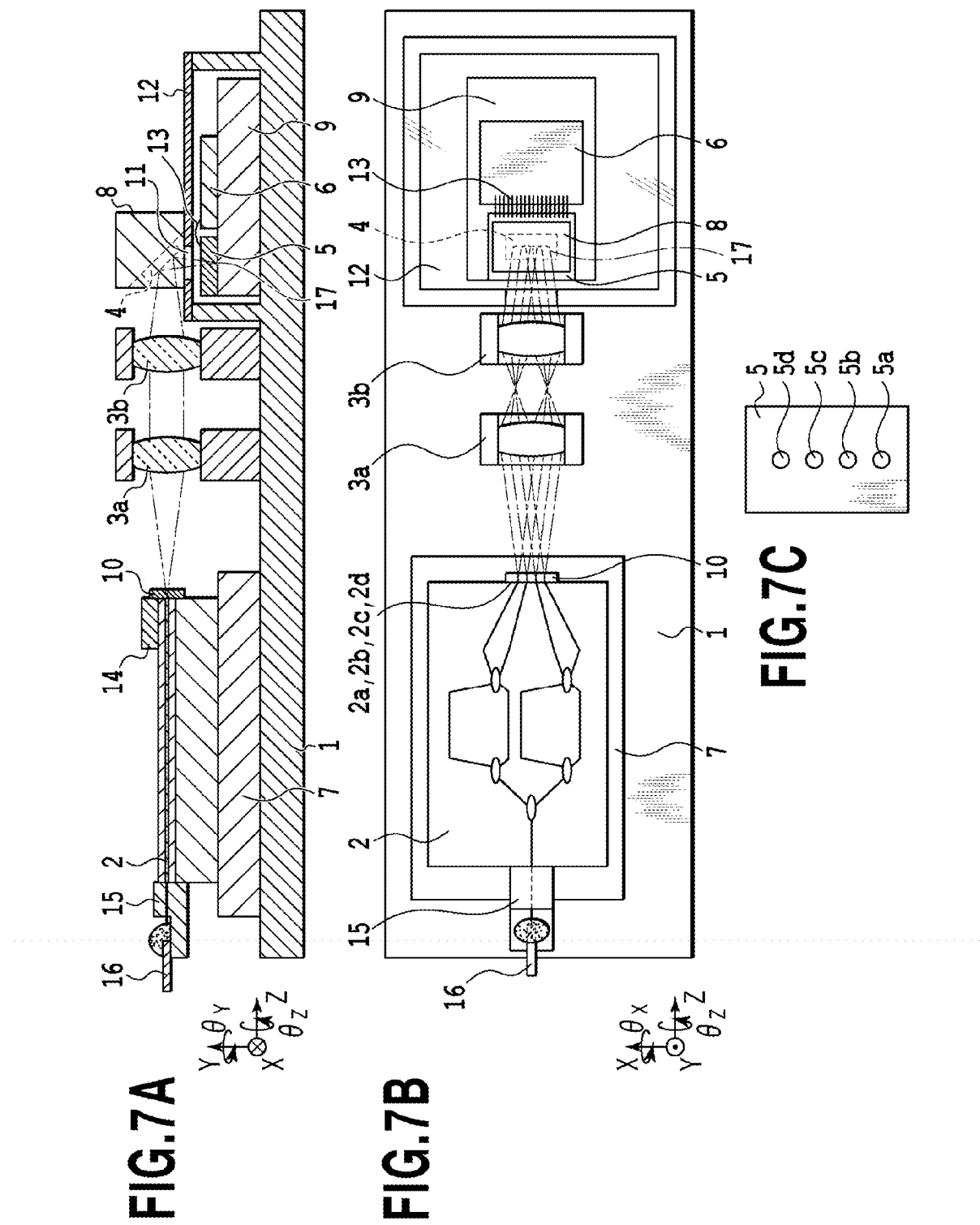

OPTICAL MODULE

CROSS REFERENCE TO RELATED APPLICATIONS

This application is a U.S. Nationalization of PCT Application Number PCT/JP2011/004999, filed on Sep. 6, 2011, which claims priority to Japanese Patent Application No. 2010-200182, filed on Sep. 7, 2010, the entireties of which are incorporated herein by reference.

TECHNICAL FIELD

The present invention relates to an optical module housing an optical waveguide array that emits an optical signal and an optical functional element array that receives and converts an optical signal into an electrical signal, and more particularly, relates to the packaging structure of an optical module equipped with a mirror for conducting optical beam array angle misalignment correction inside optics that condense an optical beam array emitted from an optical waveguide array onto the photodetectors of an optical functional element array, enabling consistent performance and a low-cost structure by fixing the mirror in place after conducting angle misalignment correction using the mirror.

BACKGROUND ART

In recent years, increases in communication traffic continue to accelerate, and the development of dense wavelength division multiplexing (DWDM) systems as a high-capacity transmission technology has been advancing rapidly. Although channels with 10 Gbps per wavelength have been multiplexed and transmitted with DWDM systems in the past, the adoption of ultra-high speed transmission formats is advancing, because by adopting ultra-high speed transmission formats having 40 Gbps or 100 Gbps per wavelength, it is possible to reduce the number of line cards and realize lower costs, space savings, and power savings. With these ultra-high speed transmission formats, reductions in OSNR sensitivity, wavelength dispersion, polarization mode dispersion, and the like may occur due to the higher speeds, restricting the transmission range. In order to avoid such transmission range restrictions, the adoption of formats such as DQPSK transmission format and the DP-QPSK transmission format, which reduce the baud rate by imposing signal information onto the optical phase state in addition to the optical intensity, is promising. Receiver circuits used with such transmission formats use an optical circuit called a delay line interferometer (DLI) or a dual polarization optical hybrid (DPOH) to convert the optical phase difference of signal light into an optical intensity difference, and the converted optical intensity is detected with a photodiode (PD). In recent years, there has been sharply rising demand for an integrated receiver module integrating an optical circuit that conducts optical phase-optical intensity conversion on an input optical signal as discussed above, a PD, and a high-frequency amp that includes functionality for current-to-voltage converting a signal converted into an optical current by the PD, and for amplifying and outputting the result as a high-frequency electrical signal. Such a conventional integrated receiver module is disclosed in PTL 1, for example.

FIGS. 1A to 1C and FIGS. 2A to 2C illustrate examples of an integrated receiver module applying an optical circuit, PD, and high-frequency amp as discussed above. FIGS. 1A to 1C and FIGS. 2A to 2C are both an example of an integrated receiver module that receives a 40 Gbps DQPSK optical signal using a DLI 2 fabricated with a planar lightwave circuit, a back-illuminated PIN-PD array 5, and a differential input TIA 6. FIGS. 1A and 2A are side views, FIGS. 1B and 2B are top views, and FIGS. 1C and 2C are front views seen from the plane of optical incidence of the back-illuminated PIN-PD array 5.

The configuration in the integrated receiver module of FIGS. 1A to 1C is as follows. The DLI 2 is affixed to a housing 1 via a mount 7. The back-illuminated PIN-PD array 5 and the differential input TIA 6 are mounted on the top face of a carrier 9, and are electrically connected by wiring 13. In the carrier 9, a sloping face is formed on part of the carrier, and a mirror 4 is attached to the sloping face. The carrier 9 carrying the back-illuminated PIN-PD array 5 and the differential input TIA 6 is mounted onto the housing 1, and is locally sealed airtight by a lid 12. Glass 10 with an anti-reflection (AR) film is fixed in place by spacer glass 14 such that the face coated with the AR film is the face that emits optical beams from the AR-coated glass. The AR film of the AR-coated glass 10 prevents reductions in optical beam intensity due to reflections caused by the difference between the refractive indexes of glass and air when optical beams emitted from an output port and propagated inside the AR-coated glass are emitted from the glass. On part of the housing 1, there is formed a box shape housing components such as the back-illuminated PIN-PD array 5, the differential input TIA 6, and the carrier 9, with a window 11 attached to a wall surface thereof such that optical beams emitted from the DLI 2 are incident under the lid. Fiber 16 is fixed in place by a fiber block 15, and connected so as to be optically coupled with the DLI 2. Output ports 2a, 2b, 2c, and 2d of the DLI 2 are arranged on an edge face where the AR-coated glass 10 of the DLI 2 in FIG. 1B is applied, in the order 2a, 2b, 2c, and 2d from the top of FIG. 1B.

Light from the fiber 16 enters the DLI 2, and the four optical beams respectively emitted from the output ports 2a, 2b, 2c, and 2d of the DLI 2 are converted by lenses 3a and 3b into condensed beams which are transmitted through the window 11 and enter the interior of the locally airtight sealed package, and after their direction of propagation is converted upward by the mirror 4, are condensed respectively onto the photodetectors 5a, 5b, 5c, and 5d of the back-illuminated PIN-PD array 5, which is arranged such that the plane of optical incidence faces downward.

With the integrated receiver module of FIGS. 2A to 2C, the DLI 2 is affixed to the housing 1 via the mount 7, similarly to the integrated receiver module of FIGS. 1A to 1C. The back-illuminated PIN-PD array 5 is mounted on a side face of the carrier 9, while the differential input TIA 6 is mounted on the top face of the carrier 9, and are electrically connected by wiring 13. The carrier 9 carrying the back-illuminated PIN-PD array 5 and the differential input TIA 6 is mounted onto the housing 1, and is locally sealed airtight by a lid 12. The AR-coated glass 10 is fixed in place by spacer glass 14 such that the face coated with the AR film is the face that emits optical beams from the AR-coated glass. On part of the housing 1, there is formed a box shape housing components such as the back-illuminated PIN-PD array 5, the differential input TIA 6, and the carrier 9, with a window 11 attached to a wall surface thereof such that optical beams emitted from the DLI 2 is incident under the lid. Fiber 16 is fixed in place by a fiber block 15, and connected so as to be optically coupled with the DLI 2. Output ports 2a, 2b, 2c, and 2d of the DLI 2 are arranged on an edge face where the AR-coated glass 10 of the DLI 2 in FIG. 2B is applied, in the order 2a, 2b, 2c, and 2d from the top of FIG. 2B. An optical beam from the fiber 16 enters the DLI 2, and the four beams of light respectively emitted from the output ports 2a, 2b, 2c, and 2d of the DLI 2 are converted by lenses 3a and 3b into condensed beams which are transmitted through the window 11 and enter the interior of the locally airtight sealed package, and are condensed respectively onto the photodetectors 5a, 5b, 5c, and 5d of the back-illuminated PIN-PD array 5, which is arranged upright such that the plane of optical incidence faces in the direction of the DLI 2.

In these integrated receiver modules, the lenses 3a and 3b are aligned in the X, Y, and Z axis directions and affixed to the housing 1 after mounting the DLI 2 onto the housing 1 and mounting the carrier 9 carrying the back-illuminated PIN-PD array 5 onto the housing 1. In the case where error from the designed values occurs in the relative positional relationship of the DLI 2 and the back-illuminated PIN-PD array 5 due to factors such as mounting position misalignments produced when mounting the DLI 2 onto the housing 1, mounting the back-illuminated PIN-PD array 5 onto the carrier 9, and mounting the carrier 9 onto the housing 1, or dimensional tolerances of respective members, if the positional misalignment is horizontal misalignment in the X, Y, and Z directions, it is possible to condense optical beams emitted from the DLI 2 onto the photodetectors 5a, 5b, 5c, and 5d of the back-illuminated PIN-PD array 5 by adjusting the positions of the lenses 3a and 3b in the X, Y, and Z directions. With such an embodiment, it is possible to realize an integrated receiver module.

CITATION LIST

Patent Literature

PTL 1: Japanese Patent Laid-Open No. 2008-134444

SUMMARY OF INVENTION

Technical Problem

However, with these integrated receiver modules, since the lenses 3a and 3b have no functionality for optical beam rotational angle adjustment, rotational angle misalignment cannot be corrected by positional adjustment of the lenses 3a and 3b in the case where rotational angle misalignment in the relative positional relationship of the DLI 2 and the back-illuminated PIN-PD array 5 occurs about the X and/or Y and/or Z axes, or when rotational angle misalignment occurs between the alignment direction of the optical beams condensed onto the photodetectors 5a, 5b, 5c, and 5d of the back-illuminated PIN-PD array 5, and the alignment direction of the photodetectors 5a, 5b, 5c, and 5d of the back-illuminated PIN-PD array 5. For this reason, it is necessary to keep the mounting angular error and error in the angular dimensions of each member extremely low so that angular misalignment in the relative positions of the DLI 2 and the back-illuminated PIN-PD array 5 is not produced. At this point, an example of the angular precision demanded will be considered for an integrated receiver module for high-speed transmission with reference to FIGS. 3A and 3B, 4, 5, and 6.

FIG. 3A is a diagram of the photodetectors 5a, 5b, 5c, and 5d of the back-illuminated PIN-PD array 5 seen from the direction perpendicular to the plane of optical incidence, while FIG. 3B is an enlarged view of the photodetector 5a. FIG. 3A illustrates angular misalignment produced between the photodetectors 5a, 5b, 5c, and 5d, and a condensed beam 17. The respective photodetectors are disposed on a line at equal intervals, and the center-to-center distance between adjacent photodetectors is taken to be P. The incident positions of the condensed beams are disposed on a line, and the intersection point between the line of the photodetectors and the line of incident positions of the condensed beams is assumed to match the middle point between the photodetectors 5b and 5c. The distance between middle point between the photodetectors 5b and 5c and the center point of the photodetector 5a farthest outward is taken to be L. When the angle obtained between the line passing through the centers of the respective photodetectors and the line passing through the centers of the respective condensed beams is taken to be θ, the axial misalignment produced between the photodetectors at either end and the optical beams at either end in the X axis direction, the Y axis direction, and the radial direction of the photodetectors, taken to be $D_x$, $D_y$, and D, respectively, are respectively expressed in Eqs. 1, 2, and 3.

[Equation 1]

$$Dx = L \times \{1 - \cos(\theta)\} \quad (1)$$

$$Dy = L \times \sin(\theta) \quad (2)$$

$$D = \sqrt{(Dx^2 + Dy^2)} \quad (3)$$

Particularly, it is necessary to design the photodiodes used for high-speed transmission to have an extremely small photosensitive diameter, in order to avoid reduced bandwidth due to their dimensions. As a specific numerical example, take the PD photodetector radius (Rpd in FIG. 4) to be 6 μm, and take the radius of a condensed beam 17 (the radius at $1/(e^2)$ times the optical intensity; Ropt in FIG. 4) to be 5 μm. Also, take the respective intervals between the four photodetectors to be a uniform 250 μm, with the interval between the photodetectors at either end taken to be 750 μm. Additionally, take the respective intervals between the four condensed beams to also be a uniform 250 μm, with the interval between the four condensed beams at either end taken to be 750 μm. FIG. 5 illustrates the results of computing the photosensitivity change produced when varying the length D of the axial misalignment between the center of a PD photodetector and the center of a condensed beam. As is evident in FIG. 5, it is necessary to keep the magnitude of axial misalignment D to 1.7 μm or less in order to keep the photosensitivity change within −0.2 dB as a change that is tolerable in actual practice. FIG. 6 illustrates the results of computing the change in $D_x$ and $D_y$ when substituting L=750 μm÷2=375 μm into Eqs. 1 and 2, and varying θ. As is evident in FIG. 6, it is demonstrated that $D_y$ rapidly increases with θ compared to $D_x$ if rotational angle misalignment occurs. Also, it is necessary to keep the rotational angle misalignment to approximately 0.25° or less in order to keep the magnitude of axial misalignment D to 1.7 μm or less. In other words, this means that it is necessary to keep the total rotational angle misalignment between the optical beam array and the PD photodetector array, which may occur due to multiple factors such as mounting position misalignments produced when mounting the DLI 2 onto the housing 1, mounting the back-illuminated PIN-PD array 5 onto the carrier 9, and mounting the carrier 9 onto the housing 1, dimensional tolerances of respective members, or warping of the DLI 2 due to a difference in the coefficient of thermal expansion between the waveguide material that forms the planar lightwave circuit and the substrate, to 0.25° or less. Consequently, extremely high precision is demanded for the dimensions of the members used and the packaging technology, and this becomes a large factor obstructing consistent product fabrication and cost lowering.

The present invention has been devised in light of such problems, and it is an object thereof to provide a low-cost optical module with highly consistent optical coupling strength and other properties as a result of adjusting and decreasing the rotational angle misalignment between an optical beam array and an optical functional element array which acts as a large factor obstructing consistent product fabrication and cost lowering in an optical module that optically couples, with lens optics, an optical waveguide array with an optical functional element array such as a planar optical receiver or transmitter element array, or a multiple-input and multiple-output waveguide array such as a modulator array.

Solution to Problem

In order to achieve such an object, an optical module according to an embodiment is provided with, in a housing, an optical waveguide array having one or a plurality of first optical incidence ports and a plurality of first optical emission ports, an optical functional element array having one or a plurality of second optical incidence ports, and/or one or a plurality of second optical emission ports, and between the optical waveguide array and the optical functional element array, lens optics using one or a plurality of lenses, and a mirror. The optical waveguide array and the optical functional element array are affixed to the housing directly or via a sub-mount. The lens optics condense optical beams emitted from the optical waveguide array onto the optical functional element array, and the mirror is disposed such that the optical beams convert the propagation direction of the optical beams emitted from the optical waveguide array and are incident onto the optical functional element array. The mirror includes functionality for finely adjusting the converted propagation direction of the optical beams propagated between the optical waveguide array and the optical functional element array by finely adjusting the angle of the mirror. The lens optics and the mirror are disposed such that the optical waveguide array and the optical functional element array are optically coupled by the lens optics and the mirror. The angle of the mirror is fixed in place after the angle of the mirror is adjusted such that the optical waveguide array and the optical functional element array are optically coupled.

In an embodiment, the optical beam emission direction of the optical waveguide array is approximately in a horizontal direction, the optical beam incidence direction of the optical functional element array is disposed facing approximately upward, and the mirror is disposed above the optical functional element array so as to convert the propagation direction of the optical beams between the approximately horizontal direction and the approximately vertical direction.

In an embodiment, the optical functional element array is sealed inside a locally airtight package, the mirror is disposed and affixed outside the locally airtight package, and at least part of the locally airtight package is formed by a material that transmits the optical beams, such that optical beams reflecting off the mirror are incident on the optical functional element array.

In an embodiment, the optical waveguide array is an optical waveguide array made up of a planar lightwave circuit in which optical waveguides are formed on a substrate, or an optical fiber array in which optical fibers are aligned along a line.

In an embodiment, the optical functional element array is a planar optical receiver or transmitter element array such as a VCSEL array or PIN-PD array, or a multiple-input and multiple-output waveguide array such as a modulator array.

In an embodiment, an anti-reflection process is performed on the edge faces of the output ports that emit the optical beams in the optical waveguide.

In an embodiment, the lens optics are made up of two lenses.

In an embodiment, the lens optics are telecentric optics configured using two lenses.

In an embodiment, the lens optics are configured using two lenses, and are lens optics in which the distance between the two lenses is narrowed or widened compared to telecentric optics.

In an embodiment, the lens optics are configured such that a plurality of optical beams are simultaneously condensed with single-lens optics.

In an optical module fabrication method according to an embodiment, the optical module comprises an optical waveguide array, an optical functional element array, one or a plurality of lenses, and a mirror. The optical module fabrication method includes a step of affixing the optical waveguide array to a housing, a step of affixing the optical functional element array to the housing directly or via a mount, a step of disposing one or a plurality of lenses between the optical waveguide array and the optical functional element array, and a step of affixing the mirror, which converts the propagation direction of optical beams, to part of the housing directly or via a fixture. All optical beams emitted from the optical waveguide array are optically coupled to the optical functional element array by adjusting the positional relationship of the optical waveguide array, the one or plurality of lenses, the mirror, and the optical functional element array, as well as the design of the one or plurality of lenses, and in addition, by adjusting the angle of the mirror, taking the normal line to the bottom face of the housing as the rotational axis, and the mirror is affixed to part of the housing.

In an embodiment, a step of locally sealing airtight a carrier carrying the optical functional element array with a lid mounted on top of the housing is additionally included, with the mirror affixed on top of the lid.

Advantageous Effects of Invention

An optical module of the present invention disposes a mirror along the optical path in optics that condense an optical beam array spatially output from an optical waveguide array onto an optical functional element array, and is able to adjust the angle of the mirror to match the alignment direction of an optical beam array with the alignment direction of an optical functional element array, even in cases where the alignment direction of the optical beam array and the alignment direction of the optical functional element array are misaligned due to the dimensional tolerances of the members, error in the mounting positions, and the like. Particularly, in an optical module using a planar lightwave circuit as the optical waveguide array, the optical waveguide array typically consists of a planar construction on a flat shape and is connected to the housing 1 on a flat face. For this reason, it is technically difficult to mount the optical waveguide array onto the housing 1 while adjusting the mounting angle. In order to keep the angular misalignment extremely low, technology that adjusts the angle of a mirror to match the alignment direction of the optical beam array with the alignment direction of the optical functional element array as in the present invention exhibits extremely great advantages for consistent fabrication.

Also, with these optical modules, the relative positional relationships of the optical beam array and the optical functional element array are determined after mounting all structural members, such as the DLI 2, the back-illuminated PIN- PD array 5, and the differential input TIA 6, onto the housing 1. For this reason, in the case where it becomes clear that the angular misalignment has not been kept to an allowed value or less at the point when all structural members have been mounted onto the housing 1 and fabrication is complete, the optical module cannot be shipped out as a product, and these structural members will all be discarded. Thus, technology that adjusts the angle of a mirror to match the alignment direction of the optical beam array with the alignment direction of the optical functional element array as in the present invention is greatly advantageous from the perspective of reducing fabrication costs by improving yield.

Furthermore, according to the present invention, it is possible to match the relative angles of the optical functional element array and the optical beam array condensed onto the optical functional element array by adjusting the mounting angle of the mirror disposed among the optics that condense the optical beam array emitted from the optical waveguide array onto the optical functional element array, even in cases where angular misalignment occurs between the optical waveguide array and the optical functional element array due to factors such as the dimensional tolerances of the optical waveguide array chip, the PD array chip, the package, or the like, and positional misalignment during packaging. Thus, it becomes possible to avoid reductions in yield due to packaging inconsistencies, and realize an optical module able to be fabricated consistently and at low cost.

Also, if optical waveguides consisting of a quartz-based planar lightwave circuit is used as the optical waveguide array, it becomes possible to realize an optical module with excellent low-loss properties, temperature dependence, long-term stability, and productivity. Also, if a planar optical receiver or transmitter element array such as a PIN-PD array or VCSEL array is used as the optical functional element array, the tolerance with respect to axial misalignment is wider and properties such as polarization dependence are also excellent compared to waveguide-based arrays and the like. For this reason, it becomes possible to consistently realize an optical module with excellent properties. Also, by using telecentric optics, the optical beam array pitch does not become misaligned even if the working distance from the lens 3b to the optical functional elements changes. For this reason, optical coupling between the optical functional element array and the optical beam array is consistent, and consequently the aligning stage becomes easier, making it possible to more consistently and efficiently realize an optical module with excellent properties. In addition, if lens optics with a narrowed distance between the two lenses compared to telecentric optics are used, the distance between the two lenses is shortened, and thus a more compact optical module can be realized. Also, by performing an anti-reflection coating process on the optical waveguide edge faces, it becomes possible to realize an optical module with high return loss and excellent properties.

BRIEF DESCRIPTION OF DRAWINGS

FIG. 2A is a side view of an optical module according to a second conventional example;

FIG. 2B is a top view of the optical module in FIG. 2A;

FIG. 2C is a front view of a back-illuminated PIN-PD array 5 seen from the direction in which an optical beam array is incident;

FIG. 3B is an enlarged view of a PD array 5a;

FIG. 7A is a side view of an optical module according to the embodiment of the present invention;

FIG. 7B is a top view of the optical module in FIG. 7A; and

FIG. 7C is a front view of a back-illuminated PIN-PD array 5 seen from the direction in which an optical beam array is incident.

DESCRIPTION OF EMBODIMENTS

Figures 1A, 1B, 1C:
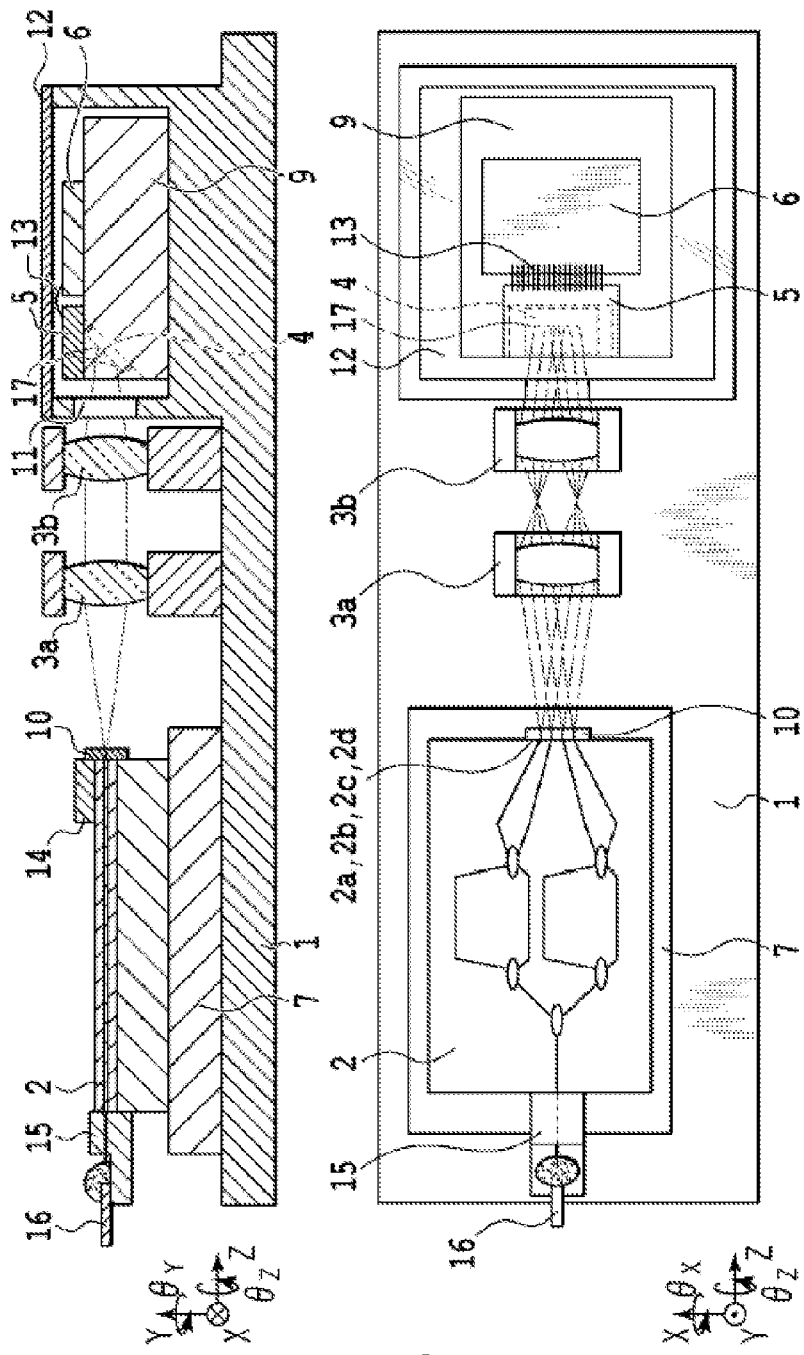
FIG. 1A is a side view of an optical module according to a first conventional example.
FIG. 1B is a top view of the optical module in FIG. 1A.
FIG. 1C is a front view of a back-illuminated PIN-PD array 5 seen from the direction in which an optical beam array is incident.

Hereinafter, an embodiment of the present invention will be described in detail with reference to the drawings.

FIGS. 7A, 7B, and 7C illustrate an optical module according to an embodiment of the present invention. FIG. 7A is a side view, FIG. 7B is a top view, and FIG. 7C is a front view of a back-illuminated PIN-PD array 5 seen from the direction in which an optical beam array is incident. The present embodiment is an example realizing an integrated receiver module that receives a 40 Gbps DQPSK optical signal using a DLI 2 fabricated with a planar lightwave circuit, a back-illuminated PIN-PD array 5, and a differential input TIA 6. In the present embodiment, the DLI 2 is affixed to a housing 1 via a mount 7. The back-illuminated PIN-PD array 5 and the differential input TIA 6 are mounted on the top face of a carrier 9, and are electrically connected by wiring 13. The back-illuminated PIN-PD array 5 is mounted on the top face of the carrier 9 such that the plane of optical incidence faces upward. The carrier 9 carrying the back-illuminated PIN-PD array 5 and the differential input TIA 6 is mounted onto the housing 1, and is locally sealed airtight by a lid 12. The AR-coated glass 10 is fixed in place by spacer glass 14 such that the face coated with the AR film is the face that emits an optical beam from the AR-coated glass. A window 11 is attached to the lid 12 such that an optical beam array emitted from the DLI 2 is incident under the lid. Fiber 16 is fixed in place by a fiber block 15, and connected so as to be optically coupled with the DLI 2. Output ports 2a, 2b, 2c, and 2d of the DLI 2 are arranged on an edge face where the AR-coated glass 10 of the DLI 2 in FIG. 7A is applied, in the order 2a, 2b, 2c, and 2d from the top of FIG. 7B. A mirror 4 that converts the propagation direction of the optical beam array downward is disposed on the top face of the lid 12. The mirror 4 is attached to a mirror block 8 partly on which a sloping face is formed. The angle of the mirror 4 is disposed such that the alignment direction of the optical beam array and the alignment direction of the photodetectors 5a, 5b, 5c, and 5d of the back-illuminated PIN-PD array 5 nearly match. First, the mirror 4 is attached to the mirror block 8, the mirror block 8 is held with a fine-control jig able to adjust the angle, and while monitoring the change in the detected intensity at the back-illuminated PIN-PD array 5 with the bottom of the mirror block 8 contacting the lid 12, the position in the X axis direction, the position in the Z axis direction, and the angle $\theta_y$ of the mirror 4 together with the mirror block 8 are adjusted such that the detected intensity is maximized for all PDs. After that, the mirror 4 is affixed to the mirror block 8 by YAG welding.

An optical beam from the fiber 16 enters the DLI 2, and the four optical beams respectively emitted from the output ports 2a, 2b, 2c, and 2d of the DLI 2 are converted by lenses 3a and 3b into condensed beams, which have their propagation direction converted by the mirror 4, are transmitted through the window 11 and enter the interior of the locally airtight sealed package, and are condensed onto the photodetectors 5a, 5b, 5c, and 5d of the back-illuminated PIN-PD array 5, which is arranged upright such that the plane of optical incidence faces upward. By adjusting the positional relationship of the DLI 2, the lenses 3a and 3b, the mirror 4, and the back-illuminated PIN-PD array 5, as well as the design of the lenses 3a and 3b, telecentric optics are configured.

Figure 4:
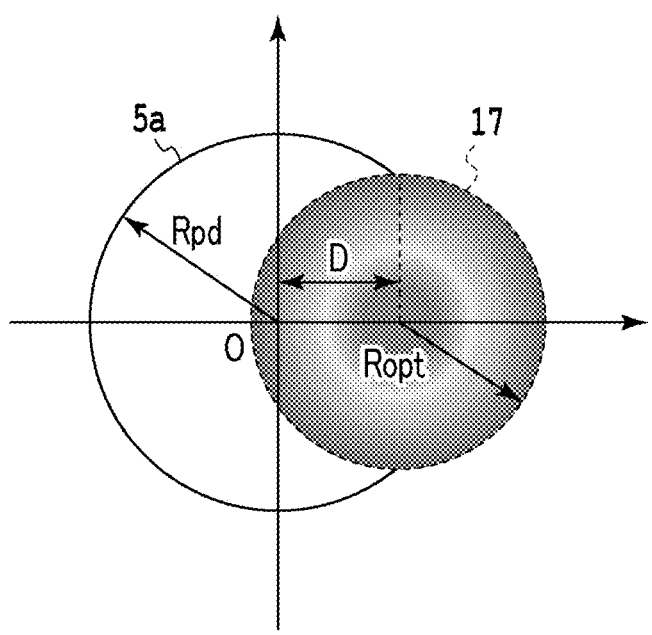
FIG. 4 is a diagram illustrating definitions of the magnitude of axial misalignment D between a PD array and an optical beam condensed onto the PD array, the PD photodetector radius Rpd, and the optical beam radius Ropt.
Figure 5:
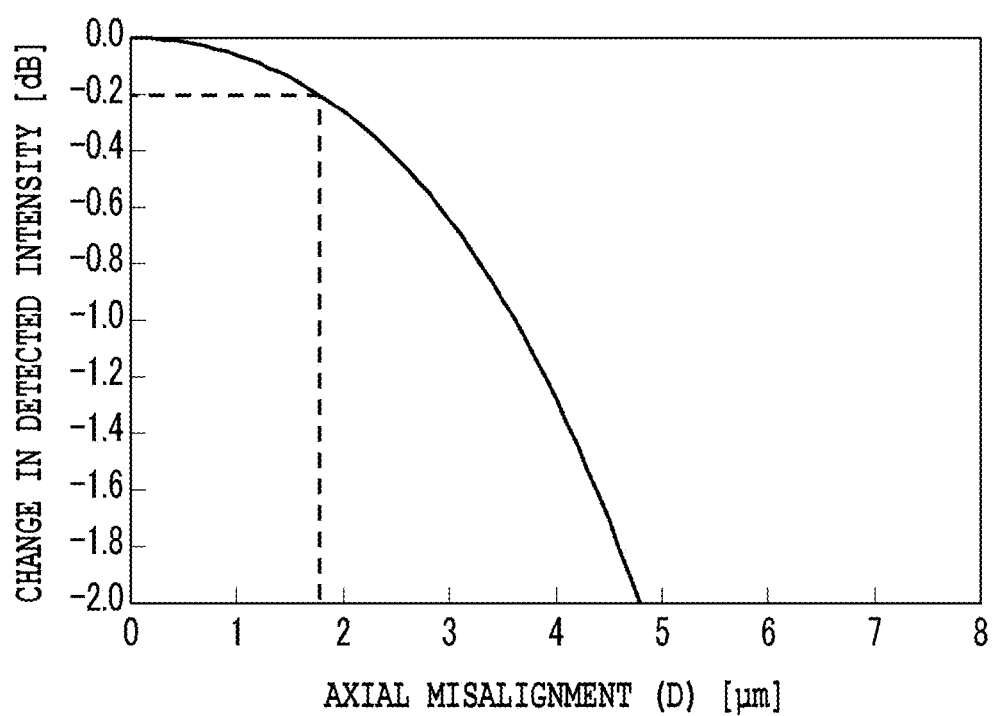
FIG. 5 is a diagram illustrating a relationship between the magnitude of axial misalignment D and the photosensitivity change.
Figure 6:
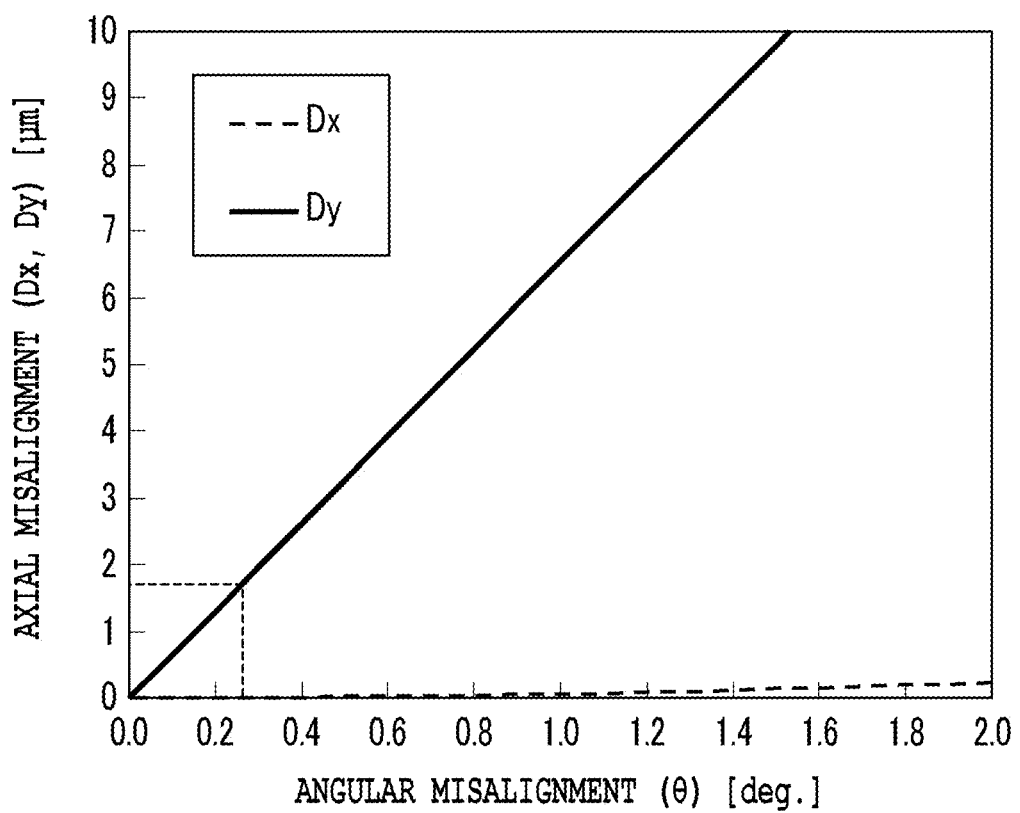
FIG. 6 is a diagram illustrating a relationship between the angular misalignment θ and the magnitude of axial misalignment D.

At this point, the advantages of an optical module of the embodiment of the present invention will be discussed specifically. Respective integrated receiver modules according to the conventional example illustrated in FIGS. 1A to 1C and according to the embodiment of the present invention illustrated in FIGS. 7A to 7C were fabricated. In the respective integrated receiver modules that were fabricated, the PD photodetector radius (Rpd in FIG. 4) was taken to be 6 μm, and the condensed beam radius (the radius at $1/(e^2)$ times the optical intensity; Ropt in FIG. 4) was taken to be 5 μm. It was designed such that the respective intervals between the four photodetectors were a uniform 250 μm, with the interval between the photodetectors at either end being 750 μm, while the respective intervals between the four optical beams were a uniform 250 μm, with the interval between the four condensed beams at either end being 750 μm. Also, PDs were disposed such that the PD alignment direction of the back-illuminated PIN-PD array 5 had a rotational angle misalignment of 0.5° with respect to the alignment direction of the optical beam array. The face of the lid 12 adjoining the mirror block 8 was taken to be parallel to the face of the back-illuminated PIN-PD array 5 on which PDs are aligned.

Figure 3A:
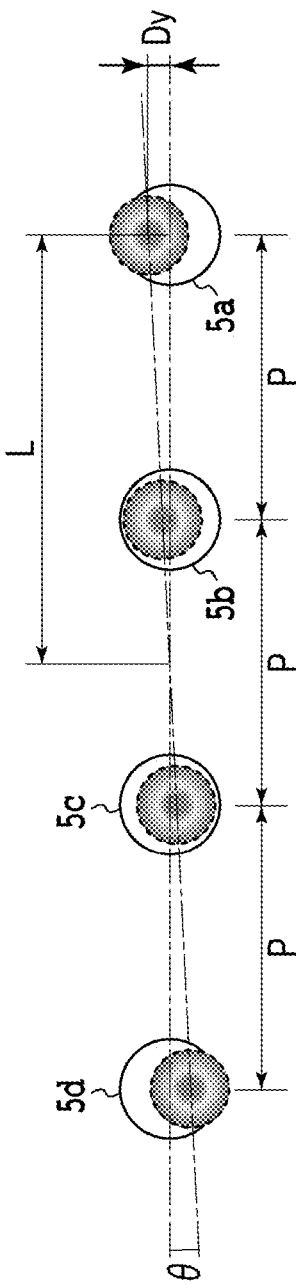
FIG. 3A is a diagram illustrating the positional relationship of a PD array and optical beams condensed onto the PD array.
Figure 3B:
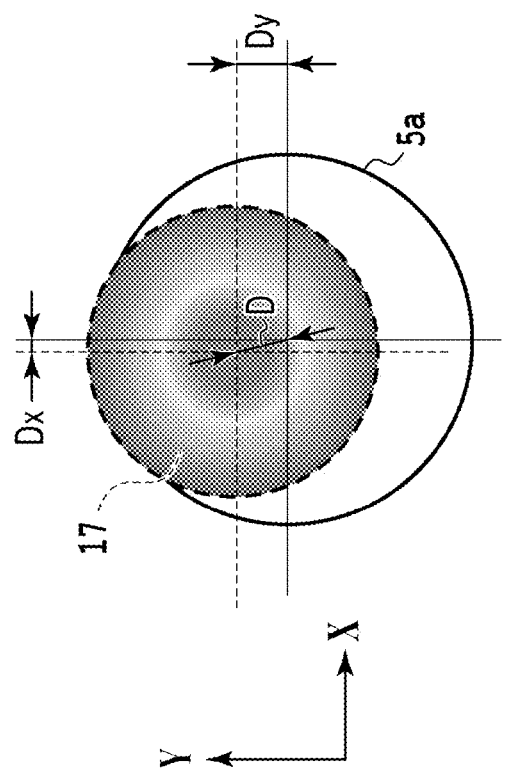

As a result, with the integrated receiver module according to the conventional example, there was a photosensitivity drop of 0.07 dB for the two PDs with the photodetectors 5b and 5c, but there was a large photosensitivity drop of 0.78 dB for the two PDs with the photodetectors 5a and 5d. As illustrated in FIG. 3A, since the alignment direction of the optical beam array and the alignment direction of the photodetectors 5a, 5b, 5c, and 5d of the back-illuminated PIN-PD array 5 have a 0.5° angular misalignment, portions of the condensed beams fall outside the PD photodetectors, and a drop in photosensitivity occurs. Since the axial misalignment is particularly greater for the PDs with the photodetectors 5a and 5d, a particularly large drop in photosensitivity occurs compared to the PDs with the photodetectors 5b and 5c. Differing photosensitivity between the inner and outer PDs is problematic because imbalances occur in differential input signals in the case of connecting to a differential input TIA 6, for example, which worsens the reception characteristics. In this way, since the conventional integrated receiver module lacks functionality for correcting angular misalignment, it is not possible to mitigate large drops in photosensitivity and disruptions in the photosensitivity balance which are produced in the case where angular misalignment occurs between the alignment direction of the optical beam array and the alignment direction of the photodetectors 5a, 5b, 5c, and 5d of the back-illuminated PIN-PD array 5. Thus, it is difficult to consistently fabricate an integrated receiver module with good performance.

Meanwhile, in the embodiment of the present invention, when affixing the mirror block 8 with the attached mirror 4 to the lid 12, the mirror block 8 is rotated 0.5° and affixed to the top face of the lid 12, taking the normal line to the top face of the lid 12 as the rotational axis, so as to correct the angular misalignment between the alignment direction of the optical beam array and the alignment direction of the photodetectors 5a, 5b, 5c, and 5d of the back-illuminated PIN-PD array 5, while the mirror 4 is affixed to the mirror block 8 after rotationally adjusting the mirror 4 to maximize the detected intensity for all PDs. Additionally, although at this point axial misalignment may occur between the optical beam array and the photodetectors 5a, 5b, 5c, and 5d of the back-illuminated PIN-PD array 5 due to the mirror rotation, the axial misalignment is compensated for by adjusting the position of the lens 3b. In the integrated receiver module thus fabricated, drops in photosensitivity were not observed in the four PDs, and in addition, imbalances in the photosensitivity between the outer and inner PDs were also not observed.

Although the present embodiment illustrates an example realizing an integrated receiver module that receives a 40 Gbps DQPSK optical signal, the present embodiment is not limited thereto. For example, various integrated optical modules, such as those for receiving a 100 Gbps DP-QPSK signal or for receiving a 40 Gbps DPSK signal, or other optical modules may still exhibit advantages similar to the present embodiment insofar as long as they are optical modules that use an optical waveguide array that spatially outputs multiple optical beams, and detect those optical beams with a PD array. In addition, although the present embodiment illustrates the case of using a DLI 2 as the optical waveguide, the present embodiment is not limited thereto. For example, an optical module may still exhibit advantages similar to the present embodiment insofar as long as it is an optical module that uses an optical waveguide array that spatially outputs multiple optical beams, such as a fiber block with fiber arranged on a V-groove substrate or an optical waveguide made up of a planar lightwave circuit such as a DPOH, and detects those optical beams with a PD array. Also, although the present embodiment illustrates the case of fabricating an integrated receiver module using back-illuminated PDs as the PDs, the present embodiment is not limited thereto. For example, advantages similar to the present embodiment may still be exhibited even in the case of fabricating an integrated receiver module using edge-illuminated PDs such as waveguide PDs and refractive PDs, or in the case of using LDs such as VCSELs or FP-LDs. Also, although the present embodiment illustrates the case of using telecentric optics with 1× magnification using two lenses, the present embodiment is not limited thereto, and advantages similar to the present embodiment may still be exhibited even in the case of using optics with different numbers of lenses used, magnifications, and the like. For example, advantages similar to the present embodiment may still be exhibited in the case of using optics that use two lenses with a spacing between the two lenses that is narrower than for telecentric types, and furthermore, it is possible to realize a compact integrated receiver module.

In addition, although the present embodiment illustrates the case of using a method of affixing a mirror to a mirror block, after attaching the mirror to the mirror block, affixing the mirror block to a lid, and adjusting the rotational angle of the mirror to maximize the detected intensity for all PDs, the present embodiment is not limited thereto, and advantages similar to the present embodiment may still be exhibited even in the case where the mirror and the mirror block are integrated, and the mirror block is affixed to the lid after adjusting the rotational angle of the mirror block to maximize the detected intensity for all PDs. Also, although the present embodiment illustrates the case of using a structure in which the PD array, TIA, and the like are locally sealed airtight and a mirror is affixed to the lid of the locally airtight sealed package, the present embodiment is not limited thereto. For example, advantages similar to the present embodiment may still be exhibited even in the case of using a structure in which a projection is provided on a member such as the housing or the carrier, and the mirror is affixed to the projection.

REFERENCE SIGNS LIST 1 housing
2 DLI
2a, 2b, 2c, 2d output port
3a, 3b lens
4 mirror
5 PD
5a, 5b, 5c, 5d PD photodetector
6 TIA
7 mount
8 mirror block
9 carrier
10 AR-coated glass
11 window
12 lid
13 electrical wiring
14 spacer glass
15 fiber block
16 fiber
17 condensed beam light

The invention claimed is:

1. An optical module comprising, in a housing:
an optical waveguide array having one or a plurality of first optical incidence ports, and a plurality of first optical emission ports,
an optical functional element array having one or a plurality of second optical incidence ports, and/or one or a plurality of second optical emission ports,
lens optics positioned between the optical waveguide array and the optical functional element array, the lens optics comprising a plurality of lenses, the lens optics being disposed along a propagation direction of optical beams emitted from the optical wave guide array, and
a mirror also positioned between the optical waveguide array and the optical functional element array,
wherein the optical waveguide array and the optical functional element array are affixed to the housing directly or via a sub-mount,
the lens optics condense optical beams emitted from the optical waveguide array onto the optical functional element array, and the mirror is disposed to convert the propagation direction of the optical beams emitted from the optical waveguide array such that the optical beams are incident onto the optical functional element array,
the mirror includes functionality for finely adjusting the converted propagation direction of the optical beams propagated between the optical waveguide array and the optical functional element array by finely adjusting the angle of the mirror,
the lens optics and the mirror are disposed such that the optical waveguide array and the optical functional element array are optically coupled by the lens optics and the mirror, and
the angle of the mirror is fixed in place after the angle of the mirror is adjusted such that the optical waveguide array and the optical functional element array are optically coupled.

2. An optical module fabrication method, the optical module comprising an optical waveguide array, an optical functional element array, a plurality of lenses, and a mirror, the method comprising:
a step of affixing the optical waveguide array to a housing,
a step of affixing the optical functional element array to the housing directly or via a mount,
a step of disposing the plurality of lenses between the optical waveguide array and the optical functional element array such that the plurality of lenses are disposed along a propagation direction of optical beams emitted from the optical waveguide array, and
a step of affixing the mirror, which converts the propagation direction of the optical beams, to part of the housing directly or via a fixture,
wherein all optical beams emitted from the optical waveguide array are optically coupled to the optical functional element array by adjusting the positional relationship of the optical waveguide array, the plurality of lenses, the mirror, and the optical functional element array, as well as the design of the one or plurality of lenses, and in addition, by adjusting the angle of the mirror, taking the normal line to the bottom face of the housing as the rotational axis, and the mirror is affixed to part of the housing.

3. The optical module fabrication method according to claim 2, further comprising a step of locally sealing airtight a carrier carrying the optical functional element array with a lid mounted on top of the housing, wherein the mirror is affixed on top of the lid.

4. The optical module according to claim 1, wherein all optical beams emitted from the optical waveguide array are optically coupled to the optical functional element array by adjusting the positional relationship of the optical waveguide array, the plurality of lenses, the mirror, and the optical functional element array, as well as the design of the plurality of lenses, and in addition, by adjusting the angle of the mirror, taking the normal line to the bottom face of the housing as the rotational axis, and the mirror is affixed to part of the housing.

5. The optical module according to claim 1, wherein the optical beam emission direction of the optical waveguide array is approximately in a horizontal direction, the optical beam incidence direction of the optical functional element array is disposed facing approximately upward, and the mirror is disposed above the optical functional element array so as to convert the propagation direction of the optical beams between the approximately horizontal direction and the approximately vertical direction.

6. The optical module according to claim 1, wherein the optical functional element array is sealed inside a locally airtight package, the mirror is disposed and affixed outside the locally airtight package, and at least part of the locally airtight package is formed by a material that transmits the optical beams, such that optical beams reflecting off the mirror are incident on the optical functional element array.

7. The optical module according to claim 1, wherein the optical waveguide array is an optical waveguide array made up of a planar lightwave circuit in which optical waveguides are formed on a substrate, or an optical fiber array in which optical fibers are aligned along a line.

8. The optical module according to claim 1, wherein the optical functional element array is a planar optical receiver or transmitter element array.

9. The optical module according to claim 1, wherein an anti-reflection process is performed on edge faces of the first optical emission ports that emit the optical beams from optical waveguides of the optical waveguide array.

10. An optical module comprising, in a housing:
an optical waveguide array having one or a plurality of first optical incidence ports, and a plurality
an optical functional element array having one or a plurality of second optical incidence ports, and/or one or a plurality of second optical emission ports;
lens optics positioned between the optical waveguide array and the optical functional element array, the lens optics being telecentric optics configured using two lenses; and
a mirror also positioned between the optical waveguide array and the optical functional element array;
wherein the optical waveguide array and the optical functional element array are affixed to the housing directly or via a sub-mount,
the lens optics condense optical beams emitted from the optical waveguide array onto the optical functional element array, and the mirror is disposed to convert the propagation direction of the optical beams emitted from the optical waveguide array such that the optical beams are incident onto the optical functional element array,
the mirror includes functionality for finely adjusting the converted propagation direction of the optical beams propagated between the optical waveguide array and the optical functional element array by finely adjusting the angle of the mirror,
the lens optics and the mirror are disposed such that the optical waveguide array and the optical functional element array are optically coupled by the lens optics and the mirror, and
the angle of the mirror is fixed in place after the angle of the mirror is adjusted such that the optical wave guide array and the optical functional element array are optically coupled.

11. The optical module according to claim 1, wherein the lens optics are configured using two lenses, and are lens optics in which the distance between the two lenses is narrowed or widened compared to telecentric optics.

12. The optical module according to claim 8, wherein the planar optical receiver or transmitter element array is a PIN-PD array or VCSEL array.

13. The optical module according to claim 1, wherein the optical functional element array is a multiple-input and multiple-output waveguide array.

14. The optical module according to claim 13, wherein the multiple-input and multiple-output waveguide array is a modulator array.

15. An optical module comprising:
a housing
an optical waveguide array affixed to the housing directly or via sub-mount, the optical waveguide array comprising one or more first optical incidence ports through which light enters the waveguide array and a plurality of first optical emission ports through which optical beams are emitted from the optical waveguide array along a propagation direction;
an optical functional element array affixed to the housing directly or via sub-mount, the optical functional element array comprising one or more second optical incidence ports;
lens optics comprising a plurality of lenses positioned to receive and condense the optical beams emitted from the first optical emission ports;
a mirror positioned to reflect the condensed optical beams received from the lens optics to the optical functional element array, the mirror being disposed at an angle to the propagation direction so as to convert the propagation direction of the received condensed optical beams such that the condensed optical beams are incident on the optical functional element array, the angle of the mirror being finely adjustable with respect to the propagation direction to finely adjust the converted propagation direction to align the condensed optical beams reflected from the mirror with the second optical incidence ports of the optical functional element array, and the angle of the mirror being fixable in place at the adjusted angle so that the optical waveguide array and the optical functional element array are optically coupled.

* * * * *